US006226254B1

(12) United States Patent
Komatsu et al.

(10) Patent No.: US 6,226,254 B1
(45) Date of Patent: May 1, 2001

(54) DISK DRIVE MECHANISM

(75) Inventors: Fumito Komatsu; Kiyotsugu Takasawa, both of Nagano (JP)

(73) Assignee: Kabushiki Kaisha Sanyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/351,328

(22) Filed: Jul. 12, 1999

(30) Foreign Application Priority Data

Jul. 10, 1998 (JP) .................................. 10-196067

(51) Int. Cl.[7] .................................. G11B 17/028
(52) U.S. Cl. .................................. 369/270
(58) Field of Search .................................. 369/270, 271; 360/99.04, 99.05

(56) References Cited

U.S. PATENT DOCUMENTS

| 4,532,622 | * | 7/1985 | Newbold | 369/271 |
| 4,791,624 | * | 12/1988 | Stinesen | 369/270 |
| 5,115,366 | * | 5/1992 | Oishi | 360/133 |
| 5,270,999 | * | 12/1993 | Chessman et al. | 369/290 |
| 5,610,900 | * | 3/1997 | Yamashita et al. | 369/271 |
| 5,757,762 | * | 5/1998 | Lee | 369/271 |
| 5,761,186 | * | 6/1998 | Mushika et al. | 369/271 |
| 5,889,757 | * | 3/1999 | Mori et al. | 369/282 |
| 6,038,206 | * | 3/2000 | Mukawa | 369/271 |
| 6,072,767 | * | 6/2000 | Iwazawa | 369/271 |

* cited by examiner

Primary Examiner—Brian E. Miller
(74) Attorney, Agent, or Firm—Sughrue, Mion, Zinn, Macpeak & Seas, PLLC

(57) ABSTRACT

In a disk drive mechanism 1 in which disk 5 is placed on a turn table 4 which is mounted on the rotary shaft 3 of an electric motor 2, and the rotary shaft 3 of the electric motor 2 is turned to turn the disk 5 with the aid of the turn table 4, the turn table 4 includes a rotary shaft section 6 secured to the rotary shaft 3 of the motor 2, a placing section 7 on which a disk 5 is placed, and an elastic coupling section 8 which couples the rotary shaft section 6 and the placing section 7 to each other so that the placing section 7 is radially movable with respect to the rotary shaft section 6. And the rotary shaft 3 has a regulating member 9 which regulates the displacement of the placing section 7 of the turn table.

7 Claims, 7 Drawing Sheets

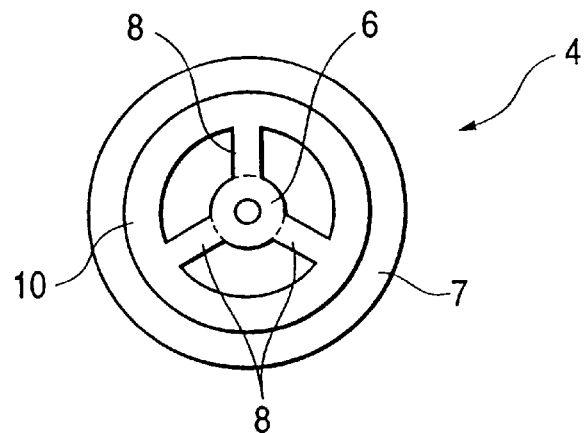
FIG. 9
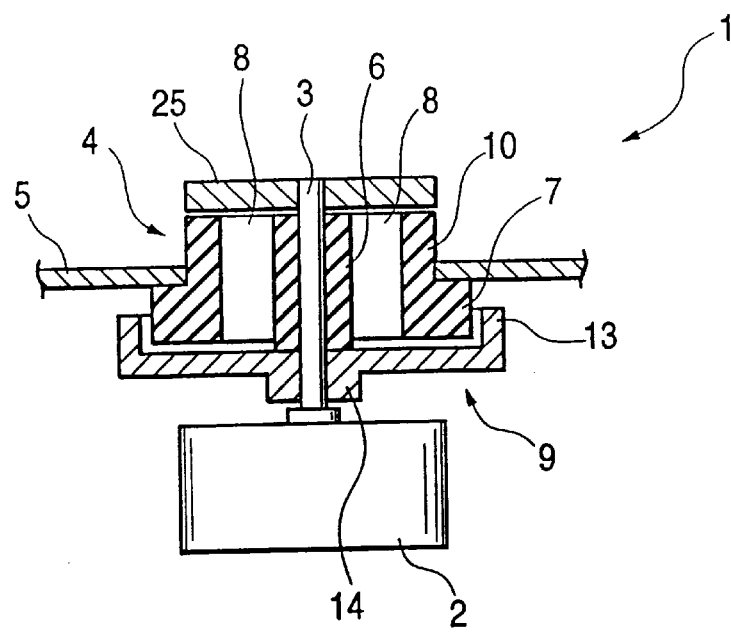
FIG. 10
FIG. 11 PRIOR ART
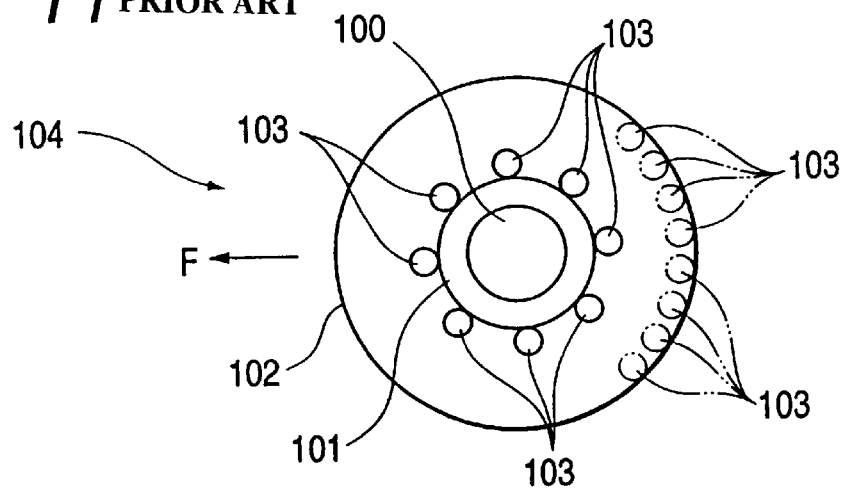

DISK DRIVE MECHANISM

BACKGROUND OF INVENTION

1. Field of the Invention

This invention relates to a disk drive mechanism in which a disk such as a CD (compact disk) and a DVD (digital video disk) is mounted on a turn table, and turned; and more particularly to a mechanism for suppressing the eccentric vibration of a disk which is turned at high speed by a disk drive mechanism.

2. Related Art

There has been a strong demand for improvement of an access speed to a disk as a disk memory such as a CD-ROM, a CD-R/W and a DVD-ROM has been popularly employed in the art. For instance, research has been conducted on an increase in the rotating speed of a disk memory twenty-four times or thirty-two times as high as the ordinary speed of rotation of the CD. In those cases, the speed (rpm) of the disk is 5000 to 6000 rpm. In the future, it may be necessary to increase the speed of the disk to about 10000 rpm.

However, in the case where, when the disk is turned at high speed as described above, a mass eccentricity causes the following problems. First the placement of the disk on the turn table may be shifted. Also the disk will experience an eccentric vibration. Especially the disk such as a DVD and a CD-ROM which is formed by bonding two disks (front and rear disk pieces) together is liable to suffer from mass eccentricity. On the other hand, according to the present industrial standard, the mass eccentricity up to 1 g.cm is permitted. Hence, when turned at high speed, the disk may suffer from eccentric vibration. If the disk suffers from eccentric vibration as described above, then the optical pickup may be lowered in signal writing and reading accuracy, or the vibration may be transmitted to another mechanism adjacent to the disk drive mechanism, which adversely affects the disk drive operation, or makes a noise. This difficulty may be eliminated by the provision of a disk vibration preventing device in addition to the disk drive mechanism. However, in this case, the device is unavoidably bulky as a whole. Therefore, the provision of a conventional disk vibration preventing device is not practical.

On the other hand, in order to prevent the eccentric vibration of the disk which turns at high speed, a vibration preventing device has been provided. In FIG. 11, reference numeral 104 designates the vibration preventing device. In the device 104, an annular magnet 101 is fixedly mounted on the rotary shaft 100 of an electric motor, and a cylindrical outer wall 102 is provided around the magnet 101, and a plurality of steel balls are provided between the magnet 101 and the outer wall 102. With the vibration preventing device, as the speed of the motor increases, the steel balls 103 are shifted to the outer wall 102 by centrifugal force, and as the speed of the motor becomes higher than the resonance frequency of the device, the steel balls 103 remain stable being shifted in the direction opposite to the direction of mass eccentricity F as indicated by the two-dot chain lines. As a result, the mass eccentricity F and the centrifugal force are canceled out by each other, so that the vibration of the disk is prevented. However, the above-described vibration preventing device 104 suffers from the following problems: In the case where the speed of rotation is high, 5000 rpm or higher, the signal writing and reading operation is lowered in accuracy. Furthermore, in the use of the disk which has no mass eccentricity, the friction and shift of the steel balls 103 in the device 104 increases the eccentricity, which may result in the eccentric vibration.

The disk drive mechanism is known in the art which, in order to concentrically mount the disk on the turn table, has a disk position determining mechanism. However, this method makes the disk drive mechanism bulky and high in manufacturing cost.

SUMMARY OF INVENTION

In view of the foregoing, an object of the invention is to provide a disk drive mechanism with which even if a disk suffering from mass eccentricity is turned at high speed, the eccentric vibration is minimized.

According to an aspect of the present invention, there is provided a disk drive mechanism comprising:

a rotary shaft;

a turn table including:
  a shaft engaging section secured to said rotary shaft;
  a placing section on which a disk is placed;
  an elastic coupling section coupling said shaft engaging section and said placing section to each other so that said placing section be radially movable with respect to said shaft engaging section;

an electric motor turning said disk with aid of said rotary shaft and said turn table; and a regulating member secured to said rotary shaft to regulate a radial displacement of said placing section of said turn table, which is a predetermined value or more.

According to the disk drive mechanism of the present invention, the disk is free from eccentric vibration when turned at high speed. Therefore, while the disk is turned at high speed, the accuracy with which data are written in or read out of the disk is prevented from being lowered by the eccentric vibration, and other devices are prevented from being adversely affected by the vibration, and making the acoustic noise is also prevented. Furthermore, the occurrence of eccentric vibration can be prevented. This feature prevents the vibration fatigue, which increases the service lives of the members such as for instance the electric motor. Moreover, the disk drive mechanism of the invention, unlike the conventional one, needs no disk position determining mechanism, which minimizes the mechanism and reduced the manufacturing cost of the same.

In addition, in the disk drive mechanism of the invention, the eccentric vibration is prevented merely by providing the coupling section at a part of the turn table. Hence, the mechanism of the invention needs no intricate means such as the conventional eccentric vibration suppressing mechanism, which contributes to a reduction in the manufacturing cost of the mechanism.

Only when the disk suffers from mass eccentricity, or only when the disk is eccentrically placed on the placing section, the center of rotation of the disk is shifted, and therefore in the case, too, where the disk suffers from no such eccentricity, the motor can be rotated at high speed. Hence, all the disks which are normally employed can be turned at high speed stably (without being swingably turned).

BRIEF DESCRIPTION OF THE DRAWING(S)

FIG. 9 is a plan view showing another example of the turn table;

FIG. 10 is a vertical sectional side view showing another example of the disk drive mechanism, which constitutes a second embodiment of the invention; and FIG. 11 is a plan view showing a vibration preventing device in a conventional disk drive mechanism.

DETAILED DESCRIPTION OF PREFERRED EMBODIMENTS

Figure 1:
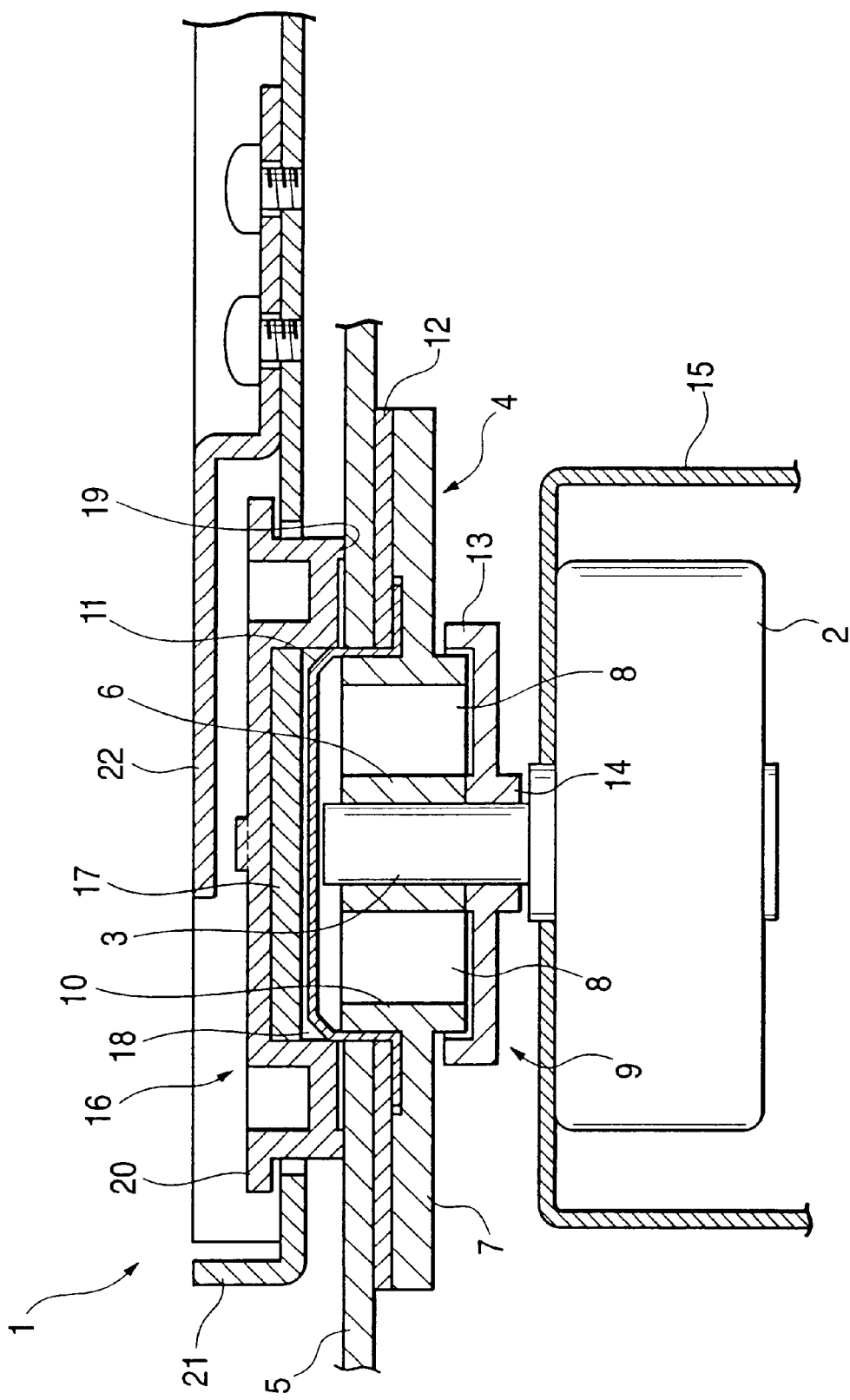
FIG. 1 is a vertical sectional side view of an example of a disk drive mechanism, which constitutes a first embodiment of the invention.

The invention will be described with reference to its preferred embodiment in detail. FIGS. 1 through 8 shows an example of a disk drive mechanism mounted on a CD-ROM drive device, which constitutes a first embodiment of the invention. The disk drive mechanism 1 is constructed as follows: A disk 5 is placed on a turn table 4 mounted on a rotary shaft 3 of an electric motor 2. The rotary shaft 3 is turned to rotate the disk 5 on the turn table 4. The turn table 4 has a shaft engaging section 6 secured to the rotary shaft 3, a placing section 7 on which a disk 5 is placed, and an elastic coupling section 8 which couples the shaft engaging section 6 and the placing section 7 to each other in such a manner that the placing section 7 is radially movable with respect to the shaft engaging section 6. The rotary shaft 3 of the motor has a regulating member 9.

The turn table is of plastic material, and the shaft engaging section 6, the placing section 7 and the coupling section 8 are provided as one unit, for instance, by injection molding. Therefore, the turn table can be readily formed at low manufacturing cost. Especially, in this embodiment, the coupling section 8 is elastic; that is, it is made of leaf springs. Hence, a metal mold for forming the turn table 4 as a plastic molding is simple in configuration and can be formed with ease; that is, the turn table 4 is low in manufacturing cost.

The shaft engaging section 6 of the turn table 4 is cylindrical, and is fixedly fitted on the rotary shaft 3 of the motor 2. The placing section 7 of the turn table 4 is substantially in the form of a circular disk, and has a cylindrical boss 10 which is formed along the periphery of the coupling section 8. A cap 11, which is of metal for instance, is coupled to the cylindrical boss 10. The central hole of the disk 5 is engaged with the cap 11, so that the disk 5 is positioned in place. The upper surface of the placing section 7 is covered with a rubber sheet 12 on which the disk 5 is placed. This feature prevents the disk 5 from slipping with respect to the turn table 4, and suppresses the transmission of the vibration of the placing section 7 to the disk 5.

Figure 3:
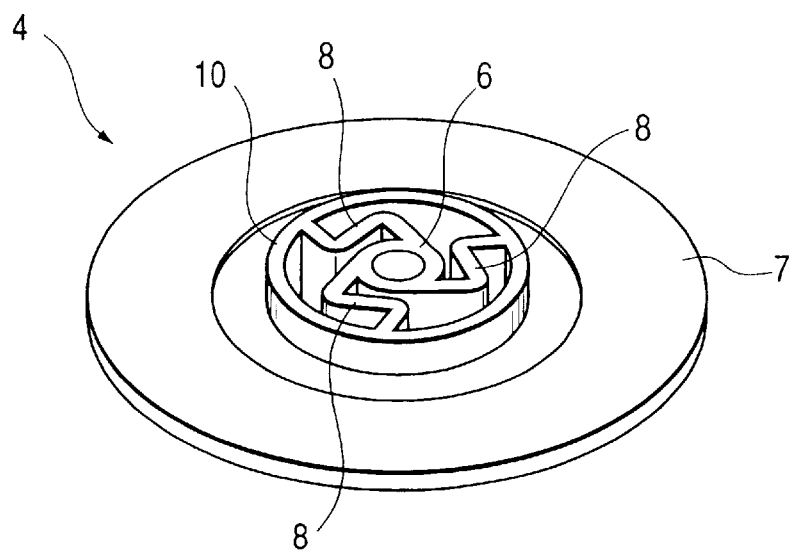
FIG. 3 is a perspective view showing a turn table.
Figure 4A:
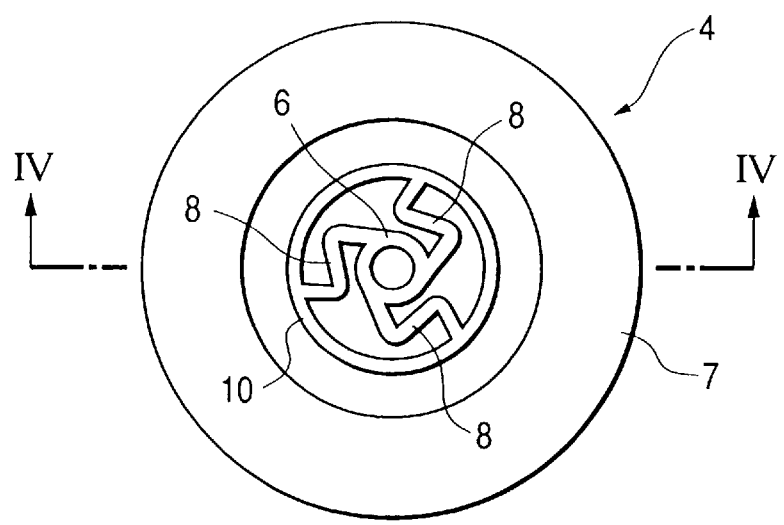
FIG. 4 shows the turn table. More specifically, the part (A) of FIG. 4 is a plan view of the turn table, and the part (B) of FIG. 4 is a sectional view taken along IV—IV in the part (A) of FIG. 4.
Figure 4B:
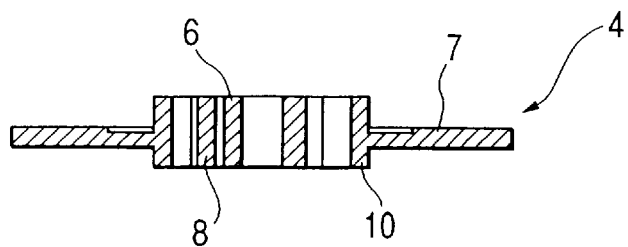
Figure 5:
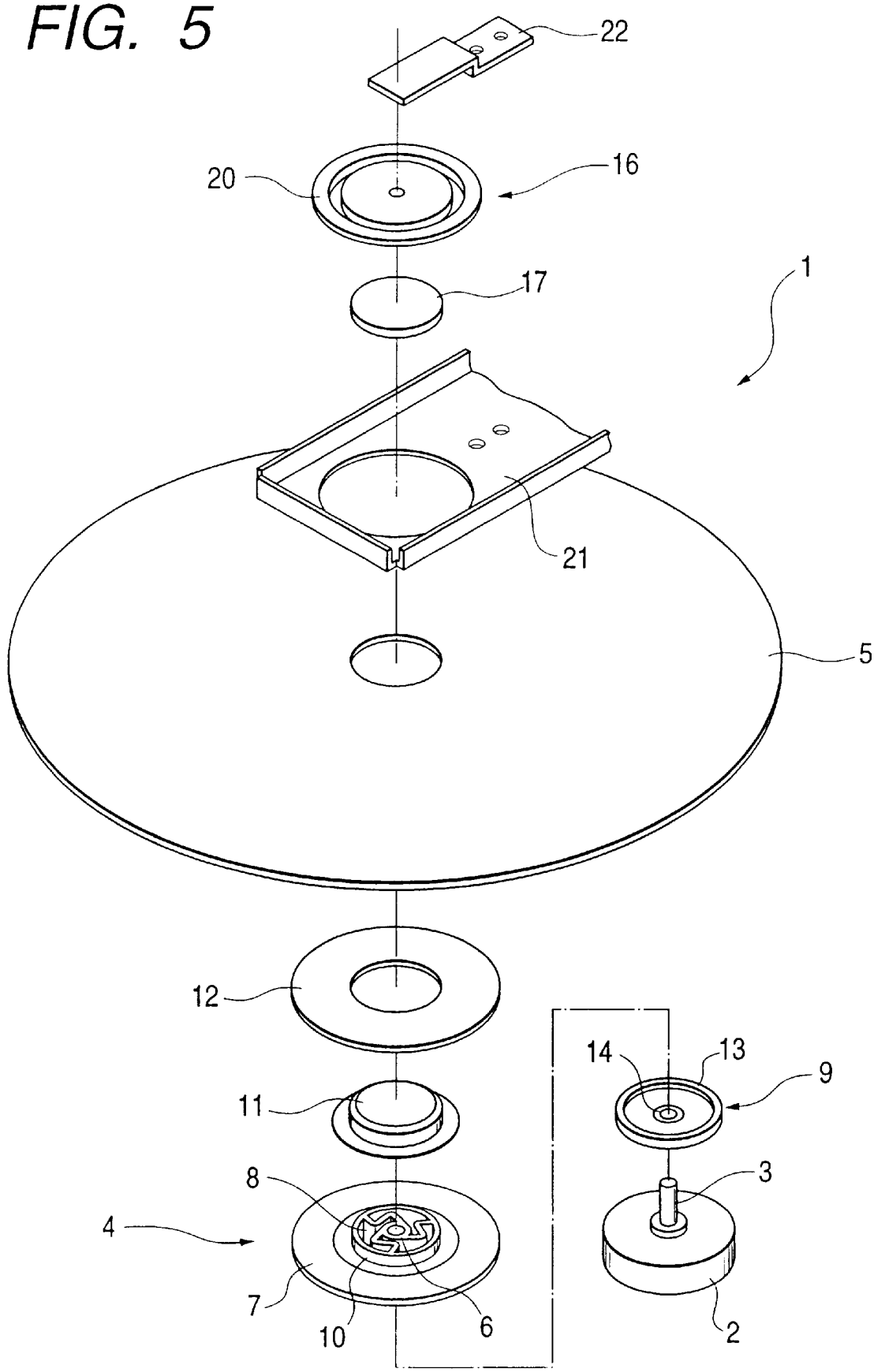
FIG. 5 is an assembling exploded view of the disk drive mechanism.
Figure 6:
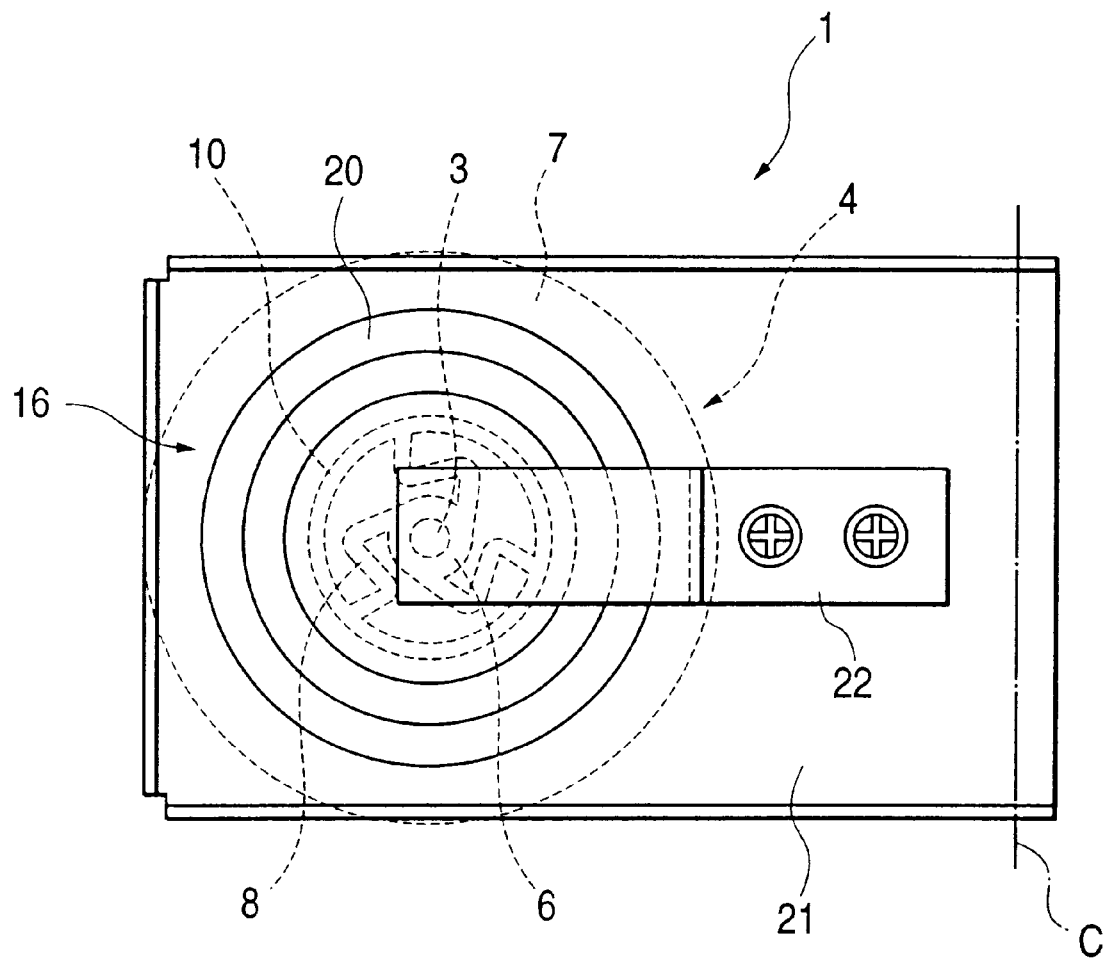
FIG. 6 is a plan view of the disk drive mechanism.
Figure 7:
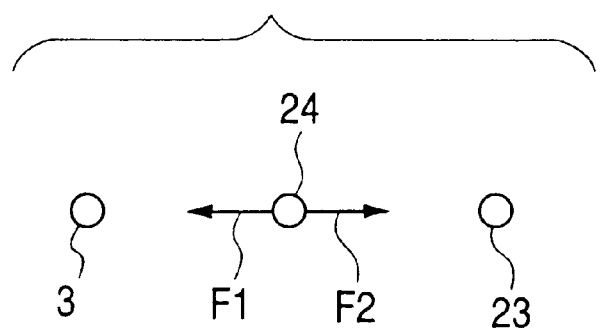
FIG. 7 is a plan view for a description of the position of the center of rotation.

The coupling section 8 is formed between the shaft engaging section 6 and the cylindrical boss 10 of the placing section 7. The coupling section 8 is made of three leaf springs (elastic members) as shown in FIGS. 3 and 4. In other words, the coupling section 8 is made up of three leaf springs which are formed bent between the shaft engaging section 6 of the turn table 4 and the placing section 7. Both end portions of each of the leaf springs are shifted circumferentially and are in parallel with each other, and are coupled to each other through a middle portion. In each leaf spring, both end portions are substantially radially extended, and the middle portion is straight. Therefore, when an external force is applied to any one of the leaf springs, the middle portion is bent to store the energy thereof; and when an external force is applied circumferentially, both end portions are bent also to store the energy thereof. That is, when, during the rotation of the turn table 4, a centrifugal force is applied to the placing section 7 because of the eccentricity of the disk 5, the leaf springs are deformed, so that the placing section 7 and the disk 5 thereon are moved circumferentially.

Furthermore, the coupling section 8 is axially long so as to prevent the axial displacement of the placing section 7. That is, the coupling section 8 is mechanically thick enough to prevent the axial displacement of the placing section 7. Hence, the vibration of the disk 5 which occurs along its surface; that is, so-called "surface vibration" is prevented.

The regulating member 9 is fitted on the rotary shaft 3 of the disk drive mechanism 2. The member 9 regulates the displacement of the placing section 7. The regulating member 9 is located near the turn table 4, and is secured to the rotary shaft 3; that is, it is a rotor which is turned together with the rotary shaft 3. In the embodiment, a regulating section 13 is a flange which is formed along the periphery of the disk-shaped regulating member 9 and is extended towards the turn table 4. The flange is located outside the cylindrical boss 10. There is a small gap between the regulating section 13 and the cylindrical boss 10. Therefore, if, during the rotation of the turn table 4, the placing section 7 is displaced as much as the gap by the centrifugal force, the boss 10 abuts against the regulating section 13 to prevent the placing section 7 from displacing further.

The distance between the regulating section 13 and the cylindrical boss can be determined from the amount of gravity center shift of the disk 5 and the speed (rpm) at which the boss 10 is brought into contact with the regulating section 13. For instance, in the case where, as specified by the present industrial standard, the allowance in gravity center shift of the disk is 1 g.cm, and it is required to cause the boss 10 to be brought into contact with the regulating section 13 when the speed of the disk reaches about 2000 rpm, it is preferable that the distance between the regulating section 13 and the boss 10 is of the order of 0.4 mm.

At the central portion of the regulating member 9, a cylindrical fixing section 14 is formed which is engaged with the rotary shaft 3 of the motor 2. The cylindrical fixing section 14 is protruded towards the turn table 4 from the disk shaped portion.

Therefore, there is a gap between the coupling section 8 and the boss 10 of the turn table 4 and the regulating member 9. This feature prevents the occurrence of friction between the coupling section 8 and the regulating member 9 when the coupling section 8 is deformed, and between the cylindrical boss 10 and the regulating member 9 when the boss 10 is displaced.

On the other hand, the motor 2 is mounted through a bracket 15 on the CD-ROM drive device. A holder 16 adapted to fix the disk 5 to the turn table is provided in confrontation with the central portion of the turn table 4. The holder 16 has a magnet hole 18 accommodating a magnet 17 which is confronted with the cap 11 to attract the latter 11, an annular fixing protrusion 19 adapted to push the disk 5 against the turn table 4, and a flange 20 which is locked to the bracket 21 adapted to support the holder thereby to prevent the holder from coming off. When the disk 5 is fixed onto the turn table 4, the magnet 17 is allowed to come near the cap 11 with a small gap between them, and under this condition the force of attraction of the magnet 17 is utilized to push the disk 5 against the turn table 4 with the aid of the annular fixing protrusion 19.

Figure 2:
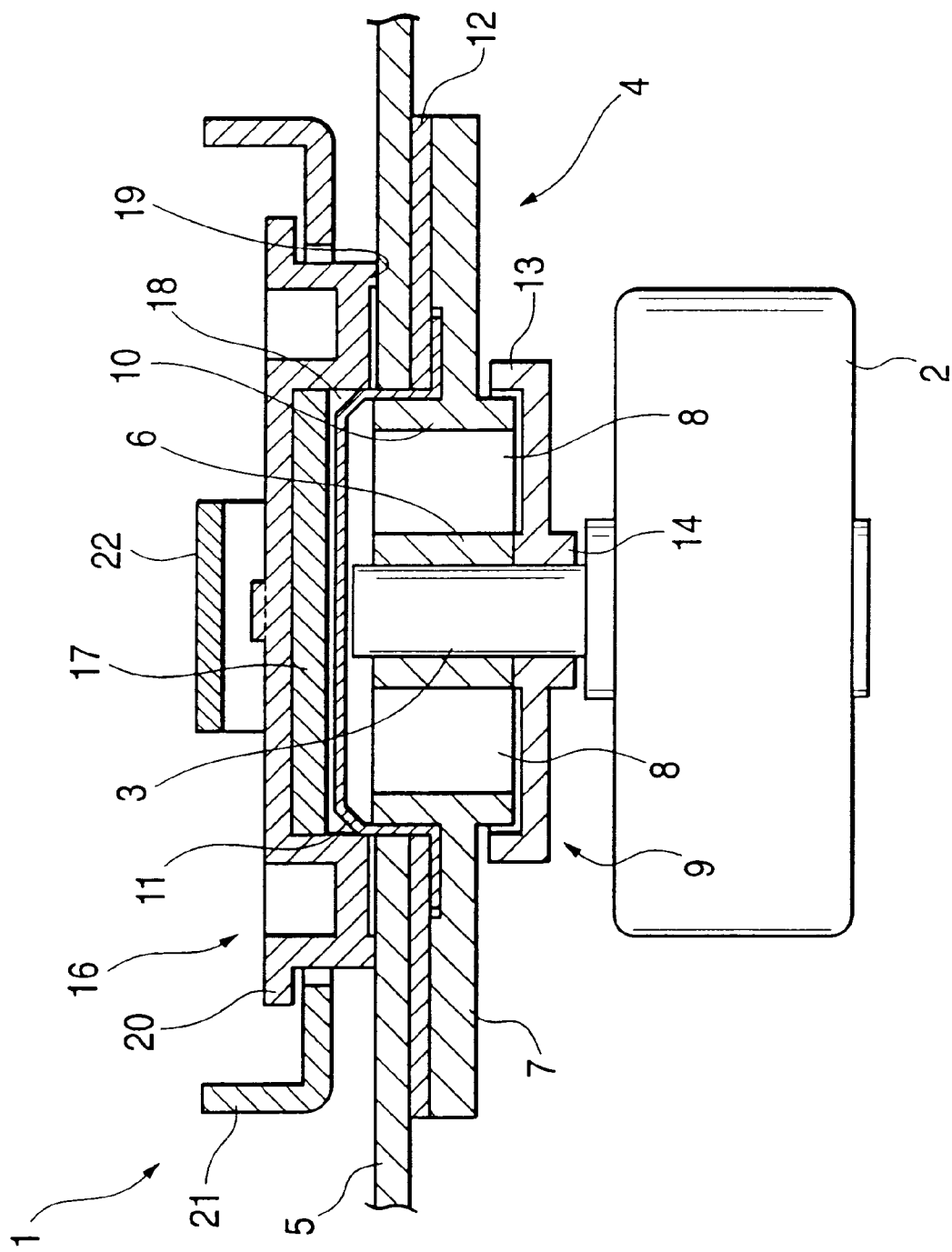
FIG. 2 is a vertical sectional front view of the disk drive mechanism shown in FIG. 1.
Figure 8:
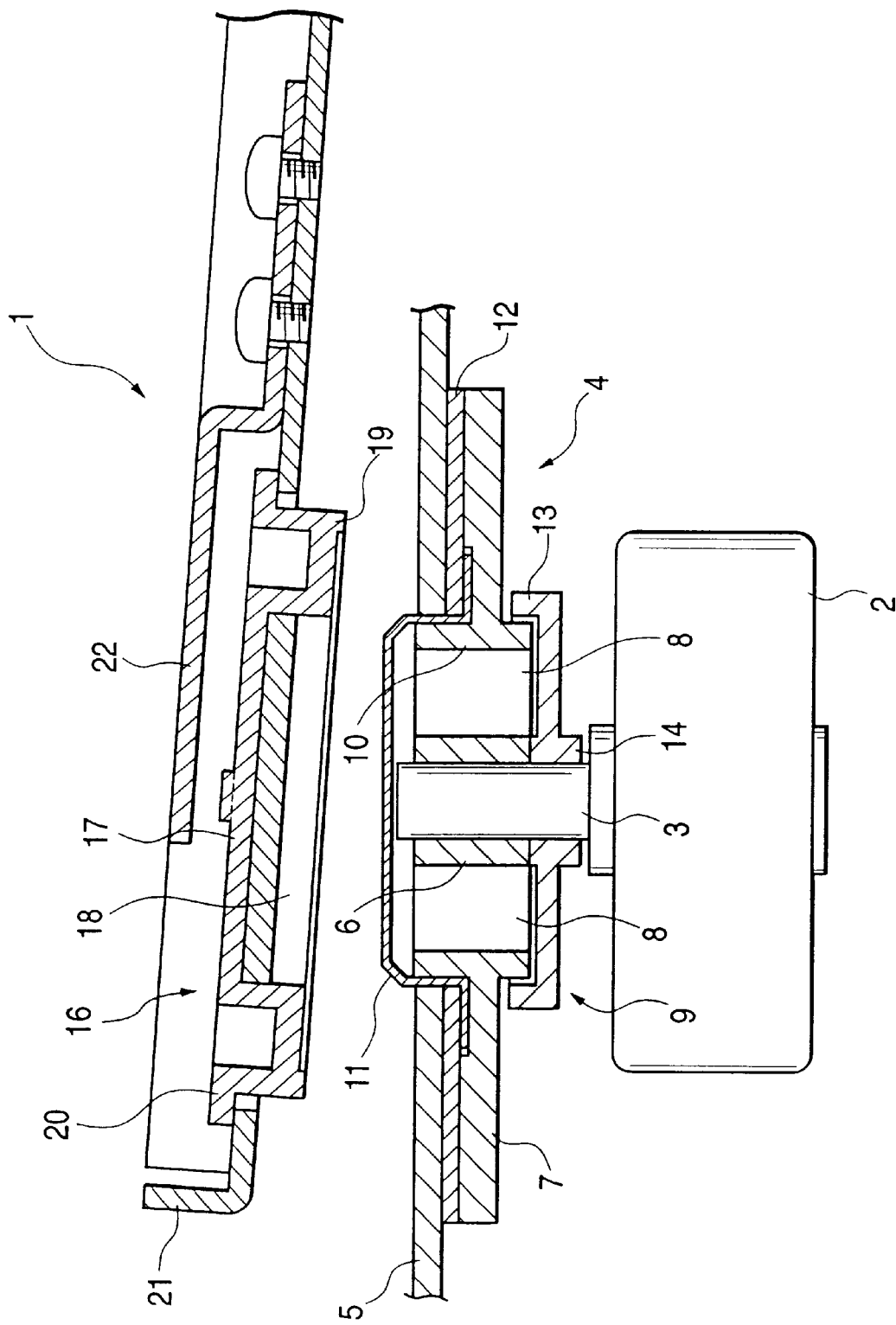
FIG. 8 is a vertical section side view of the disk drive mechanism with its bracket opened.

The bracket 21 supporting the holder 16 is swingable about the rotating axis C with respect to the CD-ROM drive device. As shown in FIGS. 1 and 2, when the bracket 21 approaches the turn table 4, the holder 16 and the turn table 4 hold the disk 5. On the other hand, as shown in FIG. 8, when the bracket 21 is moved away from the turn table 4, the whole unit including the turn table 4 supporting the disk 5 is moved horizontally; that is, the disk 5 is removed from the lower surface of the bracket 21. Under this condition, the disk is loaded or unloaded. In order to prevent the holder 16 from coming off, a retaining board 22 is secured to the bracket 21 with screws on the side of the holder which is opposite to the side where the turn table 4 is located.

The operation in which the disk 5 is turned at high speed with the above-described drive mechanism 1, will be described.

The disk 5 is loaded as follows: The bracket 21 is opened, and the disk 5 is placed on the turn table 4, and the bracket 21 is closed. As a result, the magnet 17 of the holder 16 attracts the cap 11 of the turn table 4, so that the disk 5 is secured to the turn table 4.

In the case where the disk 5 is shifted in gravity center, or the disk 5 is placed shifted on the turn table, then the rotation of the disk 5 suffers from mass eccentricity, and as the speed of the motor increases, the centrifugal force of the disk is gradually increased. And, at the time of low speed rotation of 2000 rpm or less, the centrifugal force becomes an external force which is applied through the placing section 7 to the coupling section 8, so that the latter 8 is elastically deformed; more specifically, the rotary members such as the placing section 7, the disk 5 and the holder 16 turn swingably. The coupling section 8 is mechanically thick enough in axial direction, which prevents the axial displacement of the placing section 7; that is, the surface vibration of the disk 5 is suppressed.

When the speed of the motor 2 reaches about 2000 rpm, the boss 10 of the placing section 7 is brought into contact with the regulating section 13. Hence, the placing section 7 is vibrated by contact, and the vibration of the motor 2 is transmitted through the regulating member 9 to the placing section 7. Therefore, the vibration of the placing section 7 is complicated.

Since the regulating section is annular as was described before, the placing section 7 is in contact with the regulating member 9 at all times while being swingably turned at high speed. That is, the vibration of the placing section 7 is complicated.

Because of the intricate vibration of the whole system, the placing section 7 and the disk 5 which are swingably turned about the rotary shaft 3, tend to turn around the gravity center 23 of the placing section 7 and the disk 5. That is, the complicated vibration of the placing section serves as a trigger, so that a rotation mode occurs that, similarly as in the case of an ordinary rotor, the placing section 7 and the disk 5 turn automatically around the gravity center 23.

On the other hand, the elastically deformed coupling section 8 has a restoring force F1, and therefore the center of rotation of the placing section and the disk 5 is pulled towards the rotary shaft 3. Hence, the placing section 7 and the disk 5 are not always turned around the gravity center 23, and instead they are turned around the balance point 24 of the centrifugal force F2 which moves the placing section 7 and the disk 5 towards the gravity center 23 and the restoring force F1 of the coupling section 8 which is effected towards the rotary shaft 3. In addition, because of the change in the center of rotation of the placing section 7 and the disk 5, the placing section 7 is prevented from abutting against the regulating member 9. Then, the placing section 7 and the disk do not swingably turn around the balance point near the gravity center 23 (do not eccentrically vibrate), and turn stably without abutting against the regulating member 9. In addition, the change in the center of rotation of the placing section 7 and the disk 5 can be achieved smoothly. Furthermore, even if the speed of the motor 2 is increased from 2000 rpm, for instance, to 10000 rpm, the placing section 7 and the disk 5 are turned stably.

On the other hand, in the case where the disk 5 does not suffer from mass eccentricity, and is set on the turn table suitably with good balance, and the disk 5 and the turn table 4 are free from mass eccentricity, then even if the motor 2 is rotated at high speed, the disk 5 and the turn table 4 will never swingably turn; that is, they can turn around the rotary shaft 3 of the motor 2 at high speed.

As was described above, with the disk drive mechanism 1 of the embodiment, the disk 5 can be turned at high speed without being eccentrically vibrated. That is, the disk drive mechanism 1 is free from the difficulties that the eccentric vibration lowers the accuracy with which data is written in or read out of the disk 5, and the vibration adversely affects other devices, and acoustic noises are produced, and yet the disk 5 can be turned at high speed. In addition, since the eccentric vibration can be prevented, the vibration fatigue is prevented, which increases the service life of the motor 2, etc.

Furthermore, with the disk drive mechanism 1 of the invention, unlike the conventional disk drive mechanism, it is unnecessary to employ the disk position determining mechanism, which miniaturizes the mechanism and reduces the manufacturing cost of the same.

Moreover, according to the disk drive mechanism of the embodiment, the eccentric vibration can be prevented merely by providing the coupling section 8 at a part of the turn table 4. Hence, the mechanism of the invention, unlike the conventional eccentric vibration suppressing mechanism, needs no intricate means; that is, the disk drive mechanism 1 can be manufactured at low cost.

With the disk drive mechanism 1 of the embodiment, the eccentric vibration can be prevented even if the speed of the motor 2 is increased to about 10000 rpm. Hence, even if the speed of the disk is increased more in the future, the technical concept of the invention is applicable thereto.

In addition, with the disk drive mechanism 1 of the embodiment, only when the disk 5 suffers from mass eccentricity, or only when the disk 5 is eccentrically placed on the placing section 7, the center of rotation of the disk 5 is shifted, and therefore even when the disk does not suffer from such eccentricity, the motor 2 can be turned at high speed. Hence, all the disks which are normally employed, can be turned at high speed stably (without being swingably turned).

While there has been described in connection with one preferred embodiment (the first embodiment) of the invention, it will be obvious to those skilled in the art that various changes and modifications may be made therein without departing from the invention. For instance, in the first embodiment, the turn table is made of a plastic material; however, it may be made, for instance, of a metal material, resin material, rubber material, elastomer material, sponge material, or paper material. That is, the turn table 4 may be made of a material suitable for the mechanical strength or manufacturing cost required therefor.

A second embodiment of the invention, in which the turn table is made of a rubber material, is as shown in FIGS. 9 and 10. Similarly as in the turn table shown in FIGS. 1 through 8 (the first embodiment), the turn table includes a shaft engaging section 6, a placing section 7, and a coupling section 8. The coupling section 8 is made up of three radial ribs. The coupling section 8 is made of rubber material, and is deformably radially and circumferentially. Therefore, when the disk 5 is turned, the centrifugal force elastically deforms the coupling member, so that the rotary members such as the placing section 7, the disk 5 and the holder 6 are radially swingably turned. The elastically deformed coupling section 8 has a restoring force F1, and therefore the center of rotation of the placing section 7 and the disk 5 is shifted towards the rotary shaft 3.

Furthermore, in the disk drive mechanism, on the side of the turn table 4 which is opposite to the side where the regulating member 9 is provided, an axial direction regulating member 25 is provided which is to regulate the shift, in the axial direction, of the placing section 7. In this case, the axial direction regulating member 25 is in the form of a circular disk whose diameter is equal to the outside diameter of the boss 10, and can regulate the shift, in the axial direction, of the placing section 7 and the coupling section 8. That is, the placing section 7 is clamped with the axial direction regulating member 25 and the regulating member 9 from both sides in the axial direction, so that the placing section 7 is prevented from being shifted in the axial direction, which prevents the surface vibration of the disk 5.

In the above-described embodiments, the turn table 4 is one molding; however, it may be made up of the shaft engaging section 6, the coupling section 8, and the placing section 7 which are provided as individual components. In this case, those components may be made of various materials such as plastic material, metal material, resin material, elastomer material such as rubber, sponge material, and paper material. That is, materials suitable for the mechanical strengths and manufacturing costs required for the components of the turn table 4 can be freely selected.

In the above-described second embodiment, the coupling section 8 is made up of three leaf springs or ribs; however, the invention is not limited thereto or thereby. For instance, the coupling section 8 may be made up of one or two or more than three leaf springs or ribs. Furthermore, in the embodiment, the configuration of the coupling section 8 is determined by the configuration of the leaf springs or ribs; however, the coupling section may be such that the shaft engaging section 6 and the placing section 7 are coupled to each other in such a manner that the placing section 7 is radially movable with respect to the shaft engaging section 6; that is, the coupling section 8 may be of other configurations.

In the above-described embodiment, the disk drive mechanism 1 is coupled to the CD-ROM drive device; however, the invention is not limited thereto or thereby. That is, the disk drive mechanism may be applied to other devices adapted to turn the disk at high speed.

As is apparent from the above description, with the disk drive mechanism of the invention, the disk is free from eccentric vibration when turned at high speed. Therefore, while the disk is turned at high speed, the accuracy with which data are written in or read out of the disk is prevented from being lowered by the eccentric vibration, and other devices are prevented from being adversely affected by the vibration, and making the acoustic noise is also prevented. Furthermore, the occurrence of eccentric vibration can be prevented. This feature prevents the vibration fatigue, which increases the service lives of the members such as for instance the electric motor. Moreover, the disk drive mechanism of the invention, unlike the conventional one, needs no disk position determining mechanism, which minimizes the mechanism and reduced the manufacturing cost of the same.

In addition, in the disk drive mechanism of the invention, the eccentric vibration is prevented merely by providing the coupling section at a part of the turn table. Hence, the mechanism of the invention needs no intricate means such as the conventional eccentric vibration suppressing mechanism, which contributes to a reduction in the manufacturing cost of the mechanism.

Only when the disk suffers from mass eccentricity, or only when the disk is eccentrically placed on the placing section, the center of rotation of the disk is shifted, and therefore in the case, too, where the disk suffers from no such eccentricity, the motor can be rotated at high speed. Hence, all the disks which are normally employed can be turned at high speed stably (without being swingably turned).

What is claimed is:

1. A disk drive mechanism comprising:
   a rotary shaft;
   a turn table including:
   (1) a shaft engaging section secured to said rotary shaft;
   (2) a placing section on which a disk is placed; and
   (3) an elastic coupling section coupling said shaft engaging section and said placing section to each other so that said placing section is radially movable with respect to said shaft engaging section;
   an electric motor turning said disk with aid of said rotary shaft and said turn table; and
   a regulating member secured to said rotary shaft to regulate a radial displacement of said placing section of said turn table.

2. A disk drive mechanism as claimed in claim 1, wherein said coupling section is made of one of a metal material, a resin material and an elastomer material.

3. A disk drive mechanism as claimed in claim 1, wherein said regulating member is substantially in the form of a disk, and has an annular regulating section which is axially protruded from the periphery thereof to regulate a radial displacement of said placing section of said turn table.

4. A disk drive mechanism as claimed in claim 3, wherein said regulating section is located adjacent to the outer periphery of said turn table.

5. A disk drive mechanism as claimed in claim 1, wherein said coupling section includes a plurality of elastic members which are formed bent between said shaft engaging section and said placing section of said turn table, and each elastic member having both end portions which are shifted in a circumferential direction and are in parallel with each other.

6. A disk drive mechanism as claimed in claim 1, wherein said coupling section has a predetermined width as viewed in the axial direction to prevent the axial displacement of said placing section.

7. A disk drive mechanism as claimed in claim 1, further comprising: an axial direction regulating member adapted to regulate the axial movement of said placing section, said axial direction regulating member being provided on the side of said turn table which is opposite to the side where said regulating member is provided.

* * * * *